US012644864B2

(12) United States Patent

Findikoglu et al.

(10) Patent No.: US 12,644,864 B2
(45) Date of Patent: Jun. 2, 2026

(54) COMPENSATION OF ENVIRONMENTAL AND OPERATIONAL CONDITIONS IN ULTRASONIC TESTING OF STRUCTURES

(71) Applicant: Triad National Security, LLC, Los Alamos, NM (US)

(72) Inventors: Alp Tugrul Findikoglu, Santa Fe, NM (US); Taeho Ju, Newcastle, WA (US)

(73) Assignee: Triad National Security, LLC, Los Alamos, NM (US)

( * ) Notice: Subject to any disclaimer, the term of this patent is extended or adjusted under 35 U.S.C. 154(b) by 295 days.

(21) Appl. No.: 18/472,965

(22) Filed: Sep. 22, 2023

(65) Prior Publication Data

US 2025/0102467 A1 Mar. 27, 2025

(51) Int. Cl.
*G01N 29/04* (2006.01)
*G01N 29/46* (2006.01)

(52) U.S. Cl.
CPC ............. *G01N 29/04* (2013.01); *G01N 29/46* (2013.01); *G01N 2291/023* (2013.01); *G01N 2291/103* (2013.01)

(58) Field of Classification Search
CPC .. G01N 29/04; G01N 29/46; G01N 2291/103; G01N 2291/023
USPC ........................................................ 73/632
See application file for complete search history.

(56) References Cited

U.S. PATENT DOCUMENTS

| | | | |
|---|---|---|---|
| 4,352,292 A | 10/1982 | Madigosky | |
| 4,623,468 A | 11/1986 | Lepain | |
| 4,890,055 A | 12/1989 | Van Broekhoven | |
| 5,526,689 A | 6/1996 | Coulter | |
| 5,987,990 A | 11/1999 | Worthington | |
| 7,307,914 B1 | 12/2007 | Carter | |

(Continued)

FOREIGN PATENT DOCUMENTS

| | | | |
|---|---|---|---|
| CN | 113325075 A | 8/2021 | |
| EP | 4071467 A1 * | 10/2022 | ......... G01N 21/1702 |

(Continued)

OTHER PUBLICATIONS

PCT International Search Report and Written Opinion, International Application No. PCT/US2019/037751, dated Aug. 27, 2019, 8 pages.

(Continued)

*Primary Examiner* — Jacques M Saint Surin
(74) *Attorney, Agent, or Firm* — Esplin & Associates, PC

(57) ABSTRACT

A multi-level compensation is used to compensate for environment and operational condition changes in ultrasonic testing of structures. A phase-shifting (time-domain) compensation is utilized to compensate for changes in operating temperature of a structure between acquisition of baseline and monitoring measurements. A frequency-filtering (frequency-domain) compensation is utilized to compensate for liquid-boundary effects (i.e., effects caused by static and/or dynamic liquid presence within the structure) during acquisition of baseline and monitoring measurements. The multi-level compensation addresses amplitude changes, time shifts, and frequency content variations in ultrasonic measurements due to temperature changes and acoustic interaction with liquid presence within the structure, and increases the accuracy of ultrasonic testing.

20 Claims, 16 Drawing Sheets

(56)                References Cited

U.S. PATENT DOCUMENTS

| | | | | |
|---|---|---|---|---|
| 8,176,783 | B2 | 5/2012 | Sinha | |
| 8,192,075 | B2 * | 6/2012 | Desai | G01N 29/2487 |
| | | | | 374/119 |
| 8,225,665 | B2 | 7/2012 | Geir | |
| 9,558,762 | B1 | 1/2017 | Sieracki | |
| 9,625,603 | B2 | 4/2017 | Stolpman | |
| 9,632,062 | B2 | 4/2017 | Tanaka | |
| 9,778,389 | B2 | 10/2017 | Stolpman | |
| 10,473,625 | B2 * | 11/2019 | Findikoglu | G01F 1/74 |
| 10,585,069 | B2 | 3/2020 | Findikoglu | |
| 10,909,280 | B2 * | 2/2021 | Pado | G06F 30/20 |
| 10,996,203 | B2 | 5/2021 | Findikoglu | |
| 11,226,281 | B1 * | 1/2022 | Findikoglu | G01N 29/2462 |
| 11,519,772 | B2 * | 12/2022 | Krammer | G01F 23/18 |
| 12,158,449 | B2 * | 12/2024 | Findikoglu | G01N 29/4427 |
| 2002/0058871 | A1 | 5/2002 | Oravecz | |
| 2002/0149488 | A1 | 10/2002 | Kechter | |
| 2007/0017800 | A1 | 1/2007 | Cetinkaya | |
| 2007/0072137 | A1 | 3/2007 | Peluso | |
| 2007/0104335 | A1 | 5/2007 | Shi | |
| 2009/0150094 | A1 | 6/2009 | Van Velsor | |
| 2009/0234590 | A1 | 9/2009 | Mcnealy | |
| 2010/0018311 | A1 | 1/2010 | Batzinger | |
| 2010/0079258 | A1 | 4/2010 | Ihn | |
| 2010/0278008 | A1 | 11/2010 | Ammar | |
| 2010/0319455 | A1 | 12/2010 | Ihn | |
| 2011/0301882 | A1 | 12/2011 | Andersen | |
| 2012/0055253 | A1 | 3/2012 | Sinha | |
| 2012/0055264 | A1 | 3/2012 | Sinha | |
| 2015/0053009 | A1 | 2/2015 | Yan | |
| 2015/0212048 | A1 | 7/2015 | Ganesan | |
| 2017/0076563 | A1 | 3/2017 | Guerriero | |
| 2018/0231501 | A1 | 8/2018 | Findikoglu | |
| 2018/0292356 | A1 * | 10/2018 | Findikoglu | G01N 29/4409 |
| 2020/0191754 | A1 * | 6/2020 | Findikoglu | G01N 29/223 |
| 2020/0378825 | A1 | 12/2020 | Chen | |
| 2022/0268744 | A1 | 8/2022 | Findikoglu | |

FOREIGN PATENT DOCUMENTS

| | | |
|---|---|---|
| WO | 2017099852 | 6/2017 |
| WO | WO2017099582 | 6/2017 |

OTHER PUBLICATIONS

Taeho Ju and Alp T. Findikoglu; "Ultrasonic Testing of Mechanical Changes in aWater-Filled Pipe with Multi-Mode and Broadband Signals and Two-Level Compensation"; MDPI, Sensors; 2022, 22, 8647 (p. 1-15).

\* cited by examiner

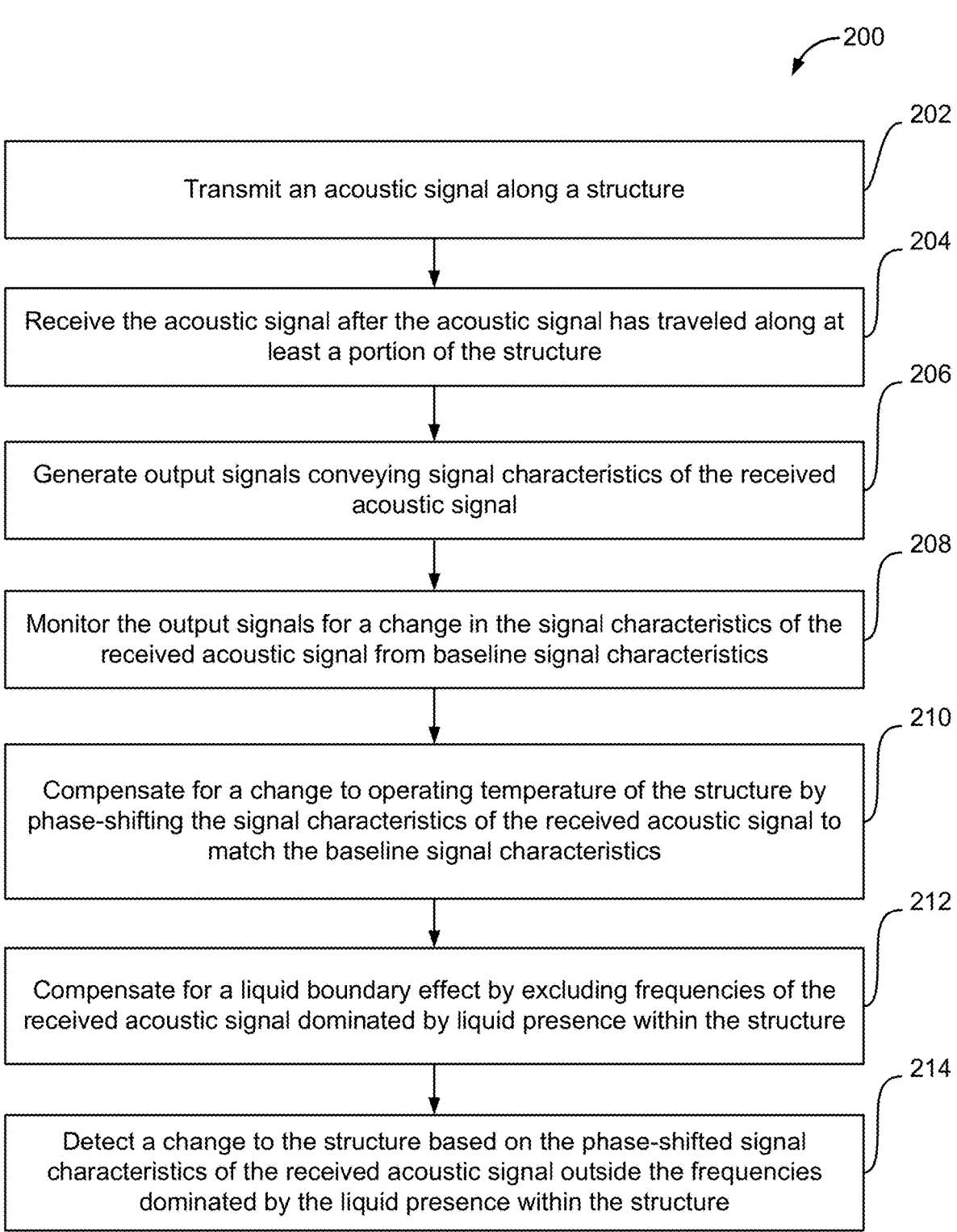

200

202

Transmit an acoustic signal along a structure

204

Receive the acoustic signal after the acoustic signal has traveled along at least a portion of the structure

206

Generate output signals conveying signal characteristics of the received acoustic signal

208

Monitor the output signals for a change in the signal characteristics of the received acoustic signal from baseline signal characteristics

210

Compensate for a change to operating temperature of the structure by phase-shifting the signal characteristics of the received acoustic signal to match the baseline signal characteristics

212

Compensate for a liquid boundary effect by excluding frequencies of the received acoustic signal dominated by liquid presence within the structure

214

Detect a change to the structure based on the phase-shifted signal characteristics of the received acoustic signal outside the frequencies dominated by the liquid presence within the structure

FIG. 2

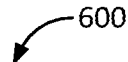
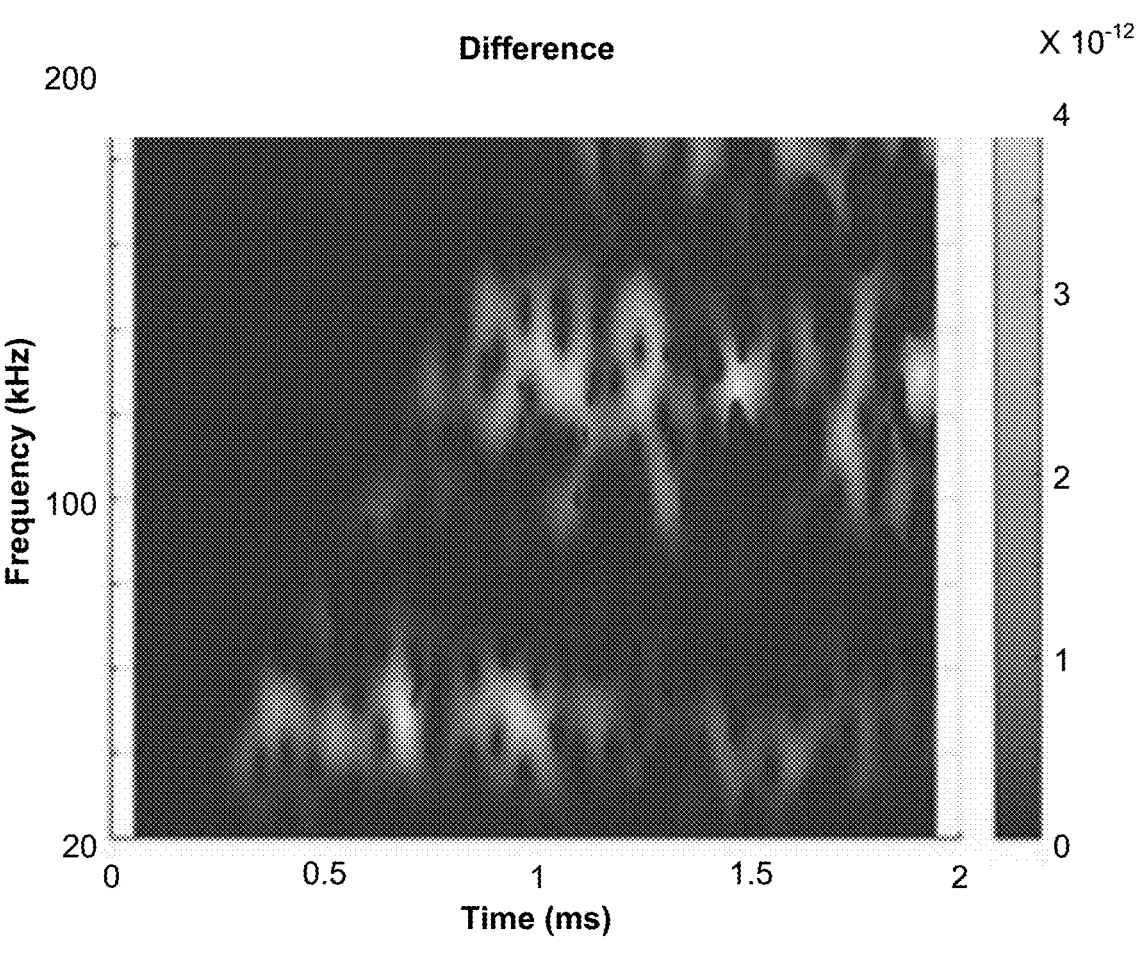
FIG. 6A

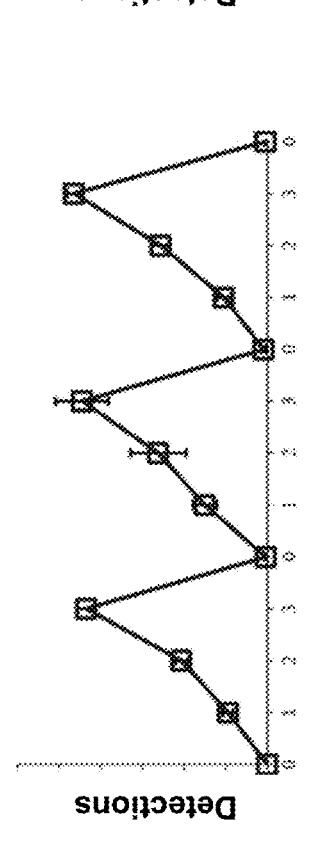
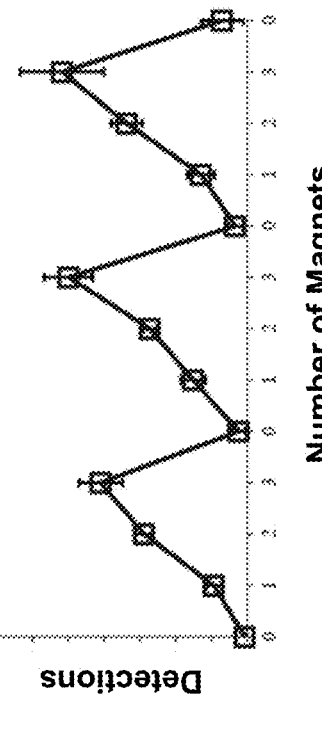
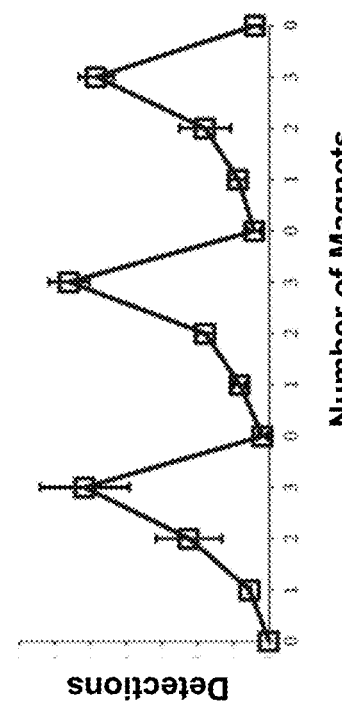
FIG. 7B

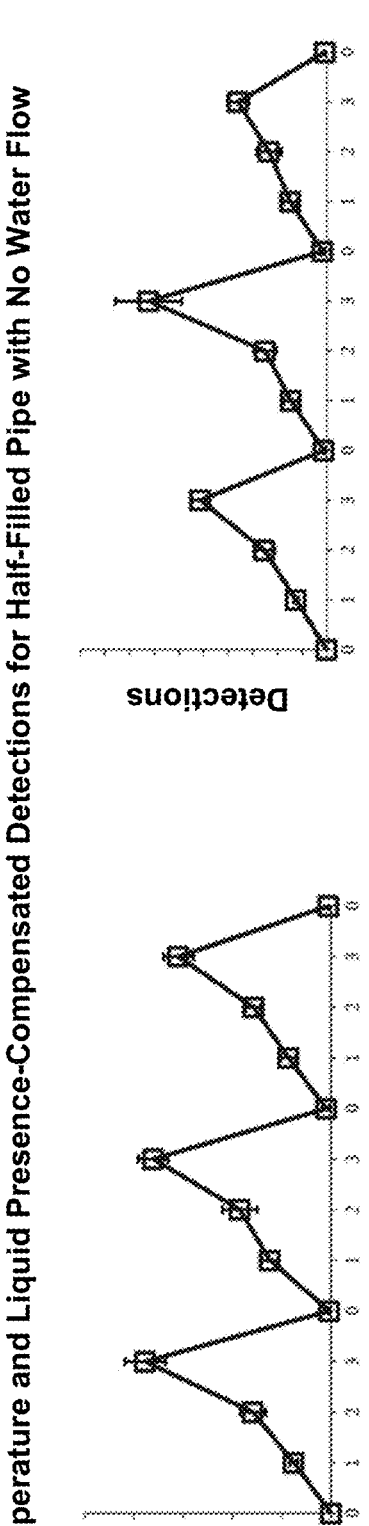
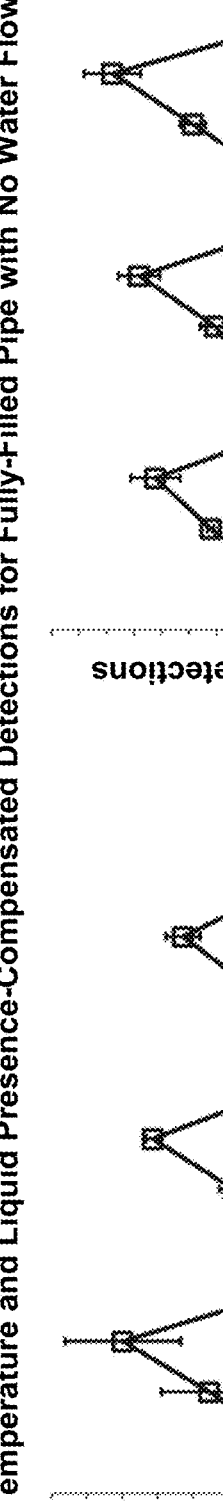
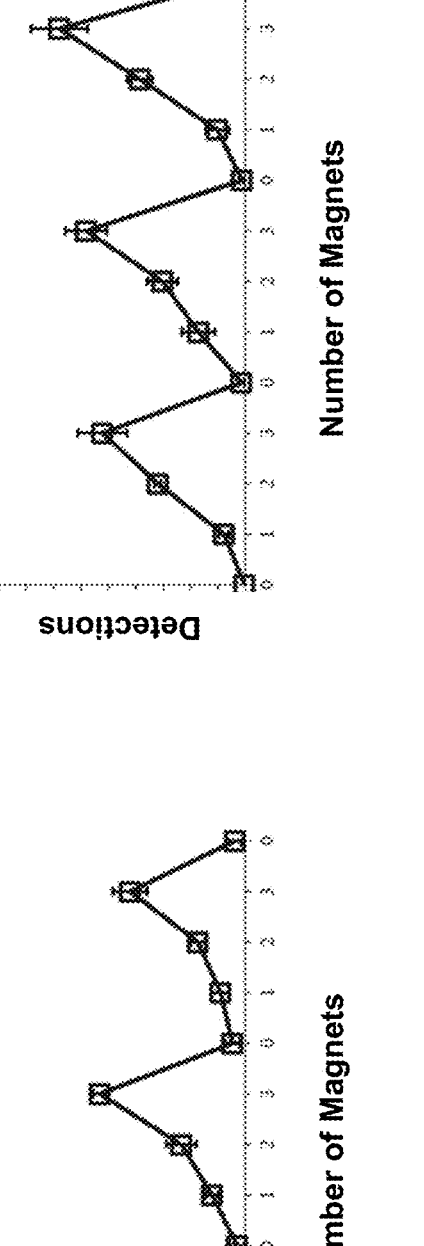
FIG. 7C

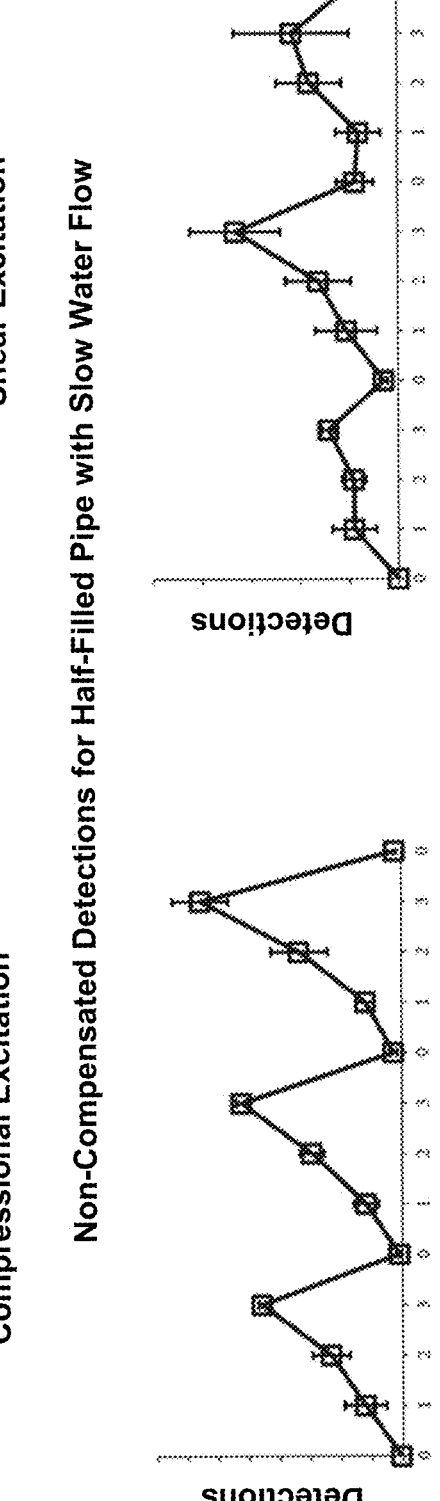
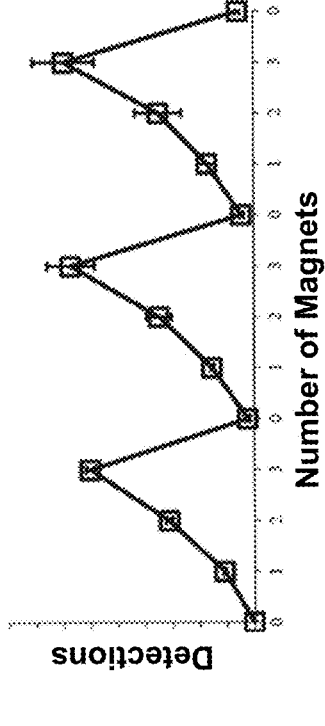
FIG. 8A

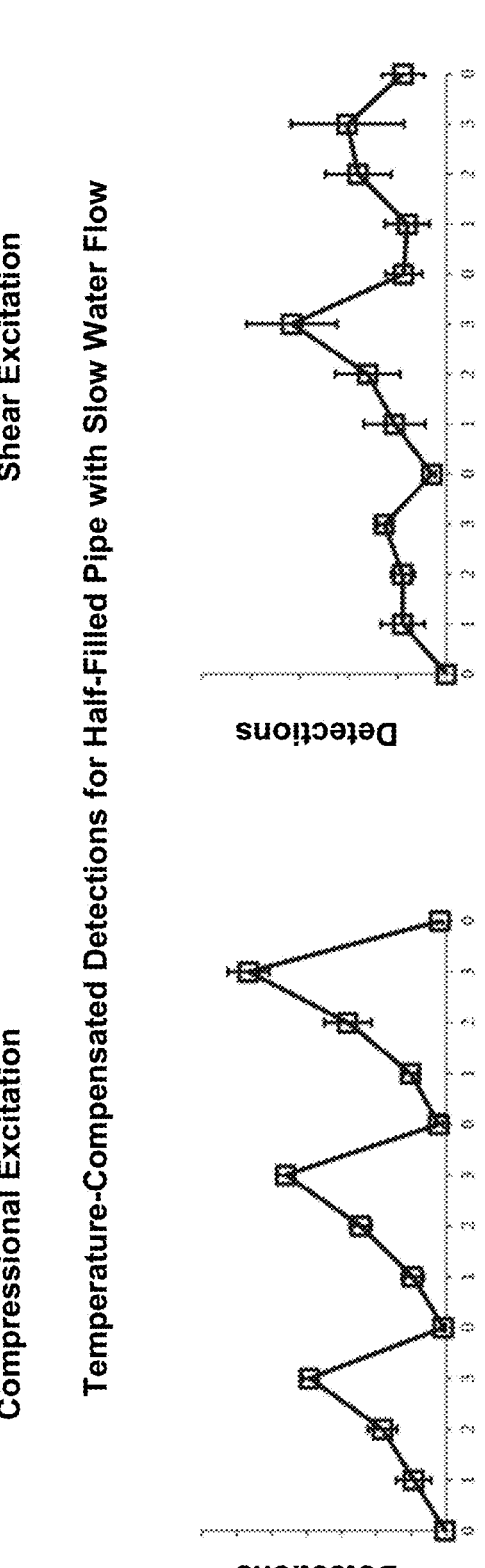
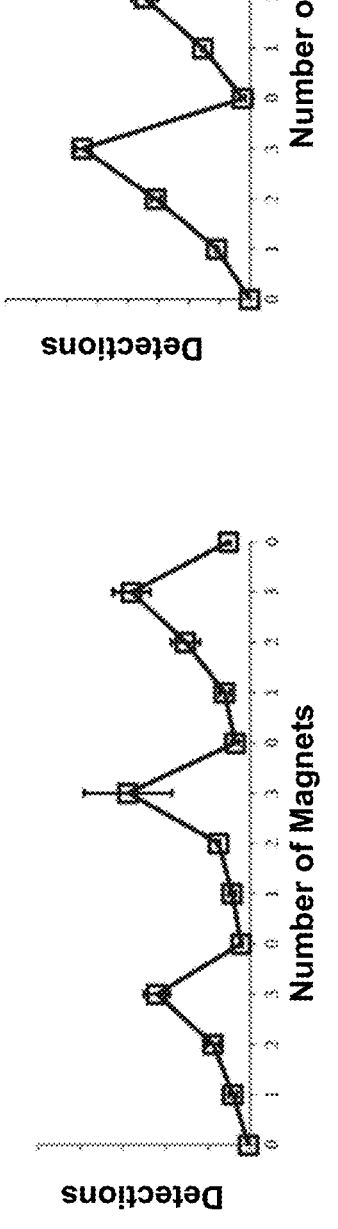
FIG. 8B

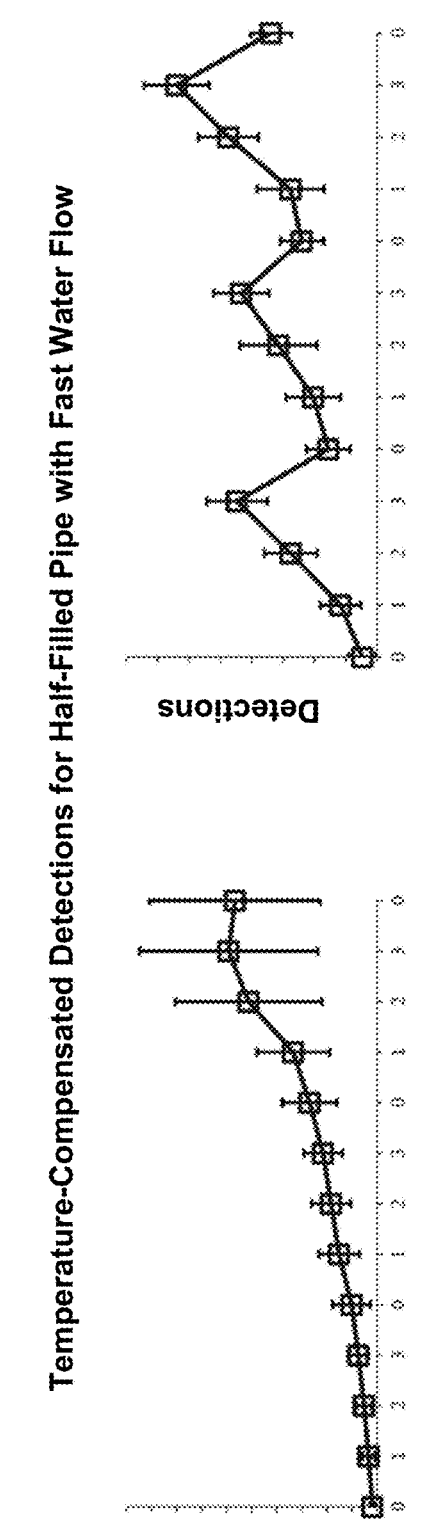
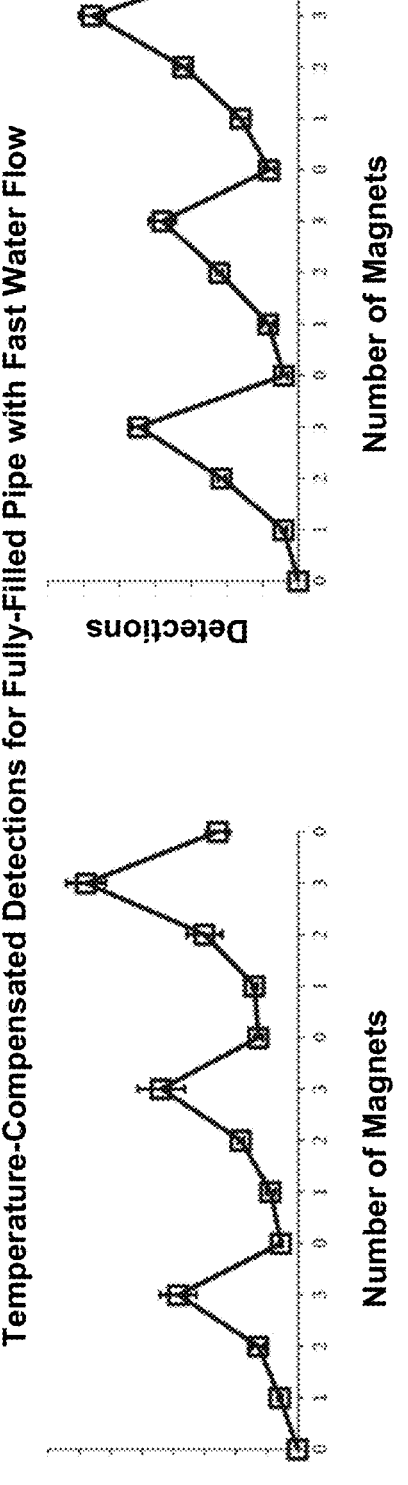
FIG. 9B

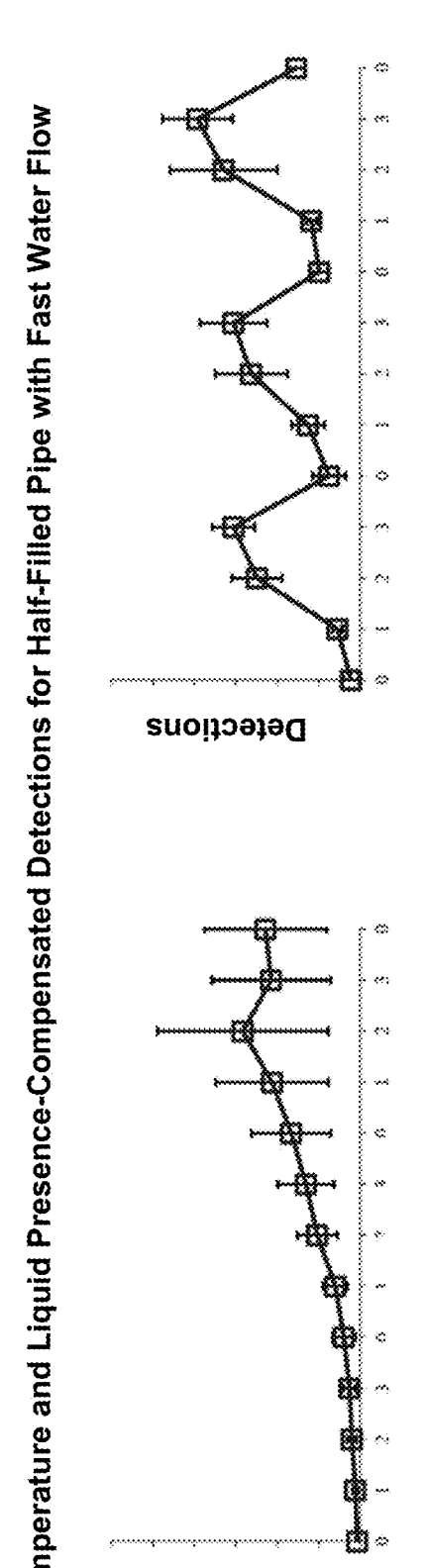
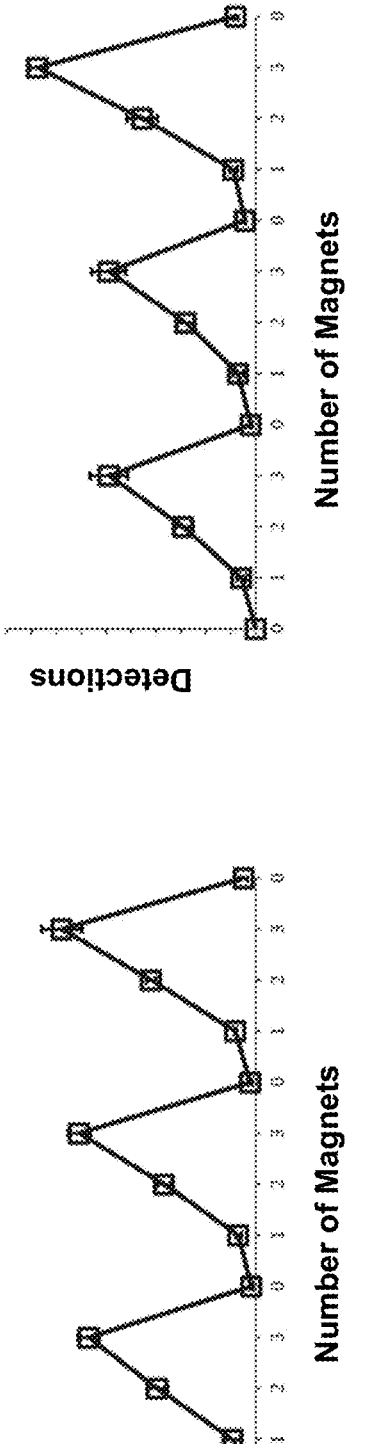
FIG. 9C

COMPENSATION OF ENVIRONMENTAL AND OPERATIONAL CONDITIONS IN ULTRASONIC TESTING OF STRUCTURES

STATEMENT REGARDING FEDERAL RIGHTS

The United States government has certain rights in this invention pursuant to Contract No. 89233218CNA000001 between the United States Department of Energy and TRIAD National Security, LLC for the operation of Los Alamos National Laboratory.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

TECHNICAL FIELD

The present disclosure relates generally to the field of compensating for environmental and operational conditions in detecting changes to structures using acoustic/ultrasonic signals.

BACKGROUND

Changes to a structure, such as material loss, material conversion, and/or material addition to a pipe, may be detected using ultrasonic testing. Changes in the environment and/or operating conditions of the structure between baseline and monitoring measurements may result in inaccurate detection of changes to the structure. For example, changes in temperature of a pipe and/or liquid presence within the pipe between times when baseline and monitoring measurements are acquired may result in inaccurate detection of changes to the pipe.

SUMMARY

This disclosure relates to detecting changes to a structure. An acoustic transmission transducer may transmit one or more acoustic signals along a structure. An acoustic reception transducer may receive the acoustic signal(s) after the acoustic signal(s) have traveled along at least a portion of the structure. The acoustic reception transducer may generate output signals conveying signal characteristics of the received acoustic signal(s). The output signals may be monitored for a change in the signal characteristics of the received acoustic signal(s) from baseline signal characteristics. The change in the signal characteristics of the received acoustic signal(s) may be caused by a change to the structure, a change in operating temperature of the structure, and/or liquid presence within the structure. The liquid presence within the structure may cause a liquid boundary effect. The change to the operating temperature of the structure may be compensated for by phase-shifting the signal characteristics of the received acoustic signal to match the baseline signal characteristics. The liquid boundary effect may be compensated for by excluding frequencies of the received acoustic signal dominated by the liquid presence within the structure. The change to the structure may be detected based on the phase-shifted signal characteristics of the received acoustic signal outside the frequencies dominated by the liquid presence within the structure and/or other information.

A system for detecting changes to a structure may include one or more electronic storage, one or more acoustic transmission transducers, one or more acoustic reception transducers, one or more processors and/or other components. The electronic storage may store information relating to acoustic signals, information relating to transmission of acoustic signals, information relating to reception of acoustic signals, information relating to output signals, information relating to signal characteristics, information relating to changes in signal characteristics, information relating to baseline signal characteristics, information relating to structures, information relating to changes to structures, information relating to operating temperature of structures, information relating to liquid presence within structures, information relating to liquid boundary effects, information relating to phase-shifting, information relating to frequency dominated by liquid presence within structures, information relating to frequency exclusion, information relating to detection of changes to structures, and/or other information.

The acoustic transmission transducer(s) may be configured to transmit one or more acoustic signals along a structure. In some implementations, an acoustic transmission transducer may include one or more compressive transducers and/or one or more shear transducers.

The acoustic reception transducer(s) may be configured to receive the acoustic signal(s) after the acoustic signal(s) have traveled along at least a portion of the structure. The acoustic reception transducer(s) may be configured to generate output signals conveying signal characteristics of the received acoustic signal(s) and/or other information. In some implementations, an acoustic reception transducer may include one or more compressive transducers and/or one or more shear transducers.

In some implementations, a structure may include a metallic, rigid structure and/or other structure. A metallic, rigid structure may include a pipe and/or other metallic, rigid structure.

The processor(s) may be configured by machine-readable instructions. Executing the machine-readable instructions may cause the processor(s) to facilitate detecting changes to a structure. The machine-readable instructions may include one or more computer program components. The computer program components may include one or more of a monitor component, a phase-shift component, a filter component, a detect component, and/or other computer program components.

The monitor component may be configured to monitor the output signals for a change in the signal characteristics of the received acoustic signal from baseline signal characteristics. The change in the signal characteristics of the received acoustic signal may include one or more differences between the signal characteristics of the received acoustic signal and the baseline signal characteristics. The change in the signal characteristics of the received acoustic signal may be caused by one or more changes to the structure, one or more changes in operating temperature of the structure, and/or liquid presence within the structure. The liquid presence within the structure may cause a liquid boundary effect.

In some implementations, the liquid presence within the structure may include flowing or non-flowing liquid within the structure. In some implementations, the liquid presence within the structure may include liquid fully or partially filling the structure.

The phase-shift component may be configured to compensate for the change(s) to the operating temperature of the structure by phase-shifting the signal characteristics of the received acoustic signal. The signal characteristics of the received acoustic signal may be phase-shifted to match the baseline signal characteristics.

The filter component may be configured to compensate for the liquid boundary effect by excluding one or more frequencies of the received acoustic signal. The frequenc (ies) of the received acoustic signal dominated by the liquid presence within the structure may be excluded.

In some implementations, the frequenc(ies) of the received acoustic signal dominated by the liquid presence within the structure may be determined based on difference between the signal characteristics of multiple acoustic signals and/or other information. The multiple acoustic signals may be received across a time duration without structural change and without operating temperature change. The difference between the signal characteristics of multiple acoustic signals may be mapped in a frequency-time domain to determine the frequenc(ies) of the received acoustic signal dominated by the liquid presence within the structure. Averaged standard deviation of power intensity in the frequency-time domain may be determined for different frequencies, and the frequenc(ies) of the received acoustic signal dominated by the liquid presence within the structure may be determined based on the averaged standard deviation of power intensity in the frequency-time domain and/or other information.

The detect component may be configured to detect the change(s) to the structure based on the phase-shifted signal characteristics of the received acoustic signal outside the frequencies dominated by the liquid presence within the structure, and/or other information. In some implementations, a change to the structure may include material loss, material conversion, or material addition.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for detecting changes to a structure.

FIG. 6A illustrates an example 2D STFT contour map of a difference signal.

FIG. 7B illustrates examples of temperature-change compensated detection of changes to a structure with non-flowing liquid within the structure.

FIG. 7C illustrates examples of temperature-change and liquid-presence compensated detection of changes to a structure with non-flowing liquid within the structure.

FIG. 8A illustrates examples of non-compensated detection of changes to a structure with slow-flowing liquid within the structure.

FIG. 8B illustrates examples of temperature-change compensated detection of changes to a structure with slow-flowing liquid within the structure.

FIG. 9B illustrates examples of temperature-change compensated detection of changes to a structure with fast-flowing liquid within the structure.

FIG. 9C illustrates examples of temperature-change and liquid-presence compensated detection of changes to a structure with fast-flowing liquid within the structure.

DETAILED DESCRIPTION

Figure 1:
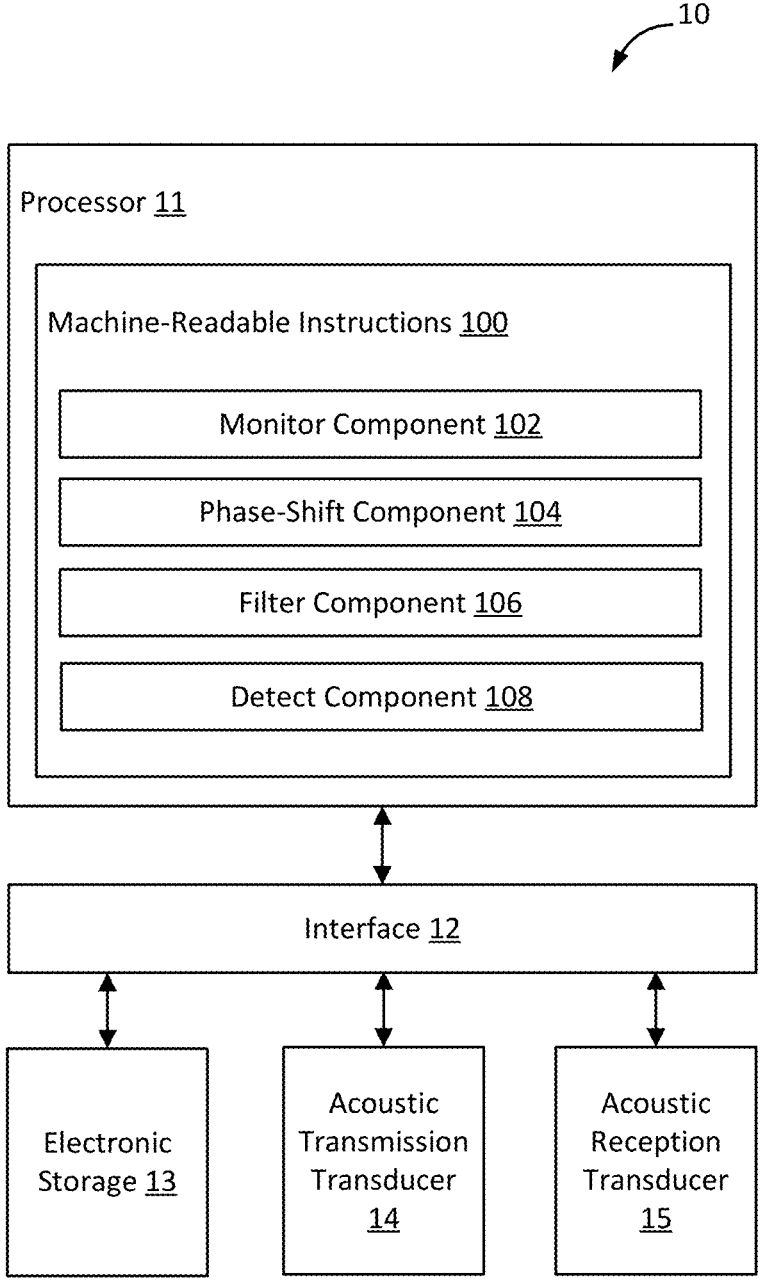
FIG. 1 illustrates an example system for detecting changes to a structure.

The present disclosure relates to compensating for environmental and operational conditions in detecting changes to structures using acoustic signals. A multi-level compensation is used to compensate for environment and operational condition changes in ultrasonic testing of structures. A phase-shifting (time-domain) compensation is utilized to compensate for changes in operating temperature of a structure between acquisition of baseline and monitoring measurements. A frequency-filtering (frequency-domain) compensation is utilized to compensate for liquid-boundary effects (i.e., effects caused by static and/or dynamic liquid presence within the structure) during acquisition of baseline and monitoring measurements. The multi-level compensation addresses amplitude changes, time shifts, and frequency content variations in ultrasonic measurements due to temperature changes and acoustic interaction with liquid presence within the structure, and increases the accuracy of ultrasonic testing.

The terms acoustic signals/waves and ultrasonic signals/waves may be used interchangeable to refer to mechanical signals/waves in the most general sense. The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an acoustic transmission transducer 14, an acoustic reception transducer 15, and/or other components.

The acoustic transmission transducer 14 may transmit one or more acoustic signals along a structure. The acoustic reception transducer 15 may receive the acoustic signal(s) after the acoustic signal(s) have traveled along at least a portion of the structure. The acoustic reception transducer 15 may generate output signals conveying signal characteristics of the received acoustic signal(s). The output signals may be monitored by the processor 11 for a change in the signal characteristics of the received acoustic signal(s) from baseline signal characteristics. The change in the signal characteristics of the received acoustic signal(s) may be caused by one or more changes to the structure, one or more changes in operating temperature of the structure, and/or liquid presence within the structure. The liquid presence within the structure may cause a liquid boundary effect. The change(s) to the operating temperature of the structure may be compensated for by phase-shifting the signal characteristics of the received acoustic signal to match the baseline signal characteristics. The liquid boundary effect may be compensated for by excluding frequencies of the received acoustic signal dominated by the liquid presence within the structure. The change(s) to the structure may be detected by the processor 11 based on the phase-shifted signal characteristics of the received acoustic signal outside the frequencies dominated by the liquid presence within the structure and/or other information.

In some implementations, one or more components of the system 10 may be separate from the system 10. For example, the acoustic transmission transducer 14 may be separate from the system 10 and may be controlled by one or more processors separate from the processor 11. While the components of the system 10 are shown as single components, this is merely for example and is not meant to be limiting. For example, while a single acoustic transmission transducer 14 and a single acoustic reception transducer 15 are shown in FIG. 1, the methods and systems of the present disclosure may include use of multiple acoustic transmission transducers placed along one or more portions of a structure and/or use of multiple acoustic reception transducers placed along one or more portions of the structure (e.g., along multiple points along the surface of the structure).

A structure may refer to the arrangement and/or organization of one or more things. Thing(s) may be arranged and/or organized into a structure to perform one or more functions. A structure may be composed of a particular type of matter or a combination of different types of matter. Arrangement/organization of matter in the structure may allow one or more acoustic signals to travel along the structure. For example, a structure may include a metallic, rigid structure and/or other structure. A structure may have a symmetrical shape or an asymmetrical shape. A structure may include one or more simple geometric shapes, one or more arbitrarily complex geometric shapes, and/or other geometric shapes.

In some implementations, a structure may include one or more volumes (space) for holding, carrying, transporting, and/or otherwise interacting with one or more substances (e.g., particular kinds of matter) and/or one or more things. For example, a structure may include a pipe, a vessel, a container, a tank, and/or other structure. Such a structure may contain one or more fluids. A fluid may include water, oil, gas, chemical emulsion, liquid, a mixture of different liquids, gases and/or solid particles. In some implementations, a structure may provide support for one or more substances and/or one or more things. For example, a structure may include a frame, a crane, a beam, a mechanical support, a flange, an elbow, a tee, a reducer, a weld, and/or other structure.

A change (mechanical change) to a structure, such as material loss, material conversion, or material addition, may impact one or more functionalities of the structure. For example, a change to a pipe may impact the pipe's structural health, leading to deformation, fracture, or breakage. A change to a structure may impact the pipe's functionality to transport substance/thing through the pipe (e.g., reduce transport capacity). For example, a change to a container/pipe may impact the container's functionality to hold/transport substance (e.g., increase possibility of container/pipe failure).

A change to a structure may result in a change to one or more signal characteristics of acoustic signals traveling along the structure. For example, small mechanical or physical changes in the structure may lead to scattering and/or attenuation of acoustic signals, which may be detectable as changes in signal characteristics of the acoustic signals. The change to the signal characteristic(s) of the acoustic signal may be used to detect the change to the structure.

A baseline signal may be obtained by transmitting an acoustic signal (e.g., broadband acoustic signal, narrowband acoustic signal, ultrasonic acoustic signal) along the structure and receiving the signal after it has traveled along at least a portion of the structure. The baseline signal may be obtained when the condition of the structure is known (e.g., the structure is in its original condition, the structure does not have any defects, the locations and types of defects along the structure are known). A monitoring signal may be obtained by transmitting an acoustic signal along the structure and receiving the signal after it has traveled along at least a portion of the structure. The monitoring signal may be obtained after the baseline signal has been obtained. The monitoring signal may be obtained when the condition of the structure is not known. Change of the structure from the known condition (when the baseline signal was obtained) may be detected based on the difference (difference signal) between the baseline signal and the monitoring signal.

Environmental and/or operational conditions of the structure may impact acquisition of baseline signals and monitoring signals. Environmental conditions of the structure may refer to the conditions/characteristics/states of the surrounding around the structure. For example, environmental conditions of the structure may include temperature of surrounding around the structure. Operational conditions of the structure may refer to the conditions/characteristics/states of how the structure is operated (e.g., to hold, carry, and/or transport fluid). For example, operational conditions of the structure may include temperature of the materials inside the structure, types of materials inside the structure, amounts of materials inside the structure, movement of materials inside the structure (e.g., speed of fluid flow, types of fluid flow). Other types of environmental conditions and operational conditions are contemplated.

Use of acoustic signal to detect structural changes may be sensitive to environmental and operational conditions of the structure. Environmental and operational conditions of the structure, such as changes in temperature and/or the presence of liquid within the structure, may cause amplitude changes, time shifts, and frequency content variations in the acoustic signals as they travel along the structure. Such impact on the acoustic signals, if not properly compensated, may cause error in detecting changes to the structure. For example, changes in temperature and/or the presence of liquid within the structure may cause a non-existent structural change to be detected, cause a structural change to not be detected, and/or cause a structural change to be inaccurately detected (e.g., detected at the wrong location, detected as a wrong type of change).

The present disclosure utilizes a multi-level compensation to address environmental and operational conditions of the structure in detecting changes to a structure. Phase shifting of signals in the time-domain is used to compensate for changes in the operating temperature of the structure between acquisition of baseline and monitoring signals. Frequency-filtering in the frequency-domain is used to compensate for liquid-boundary effects caused by the static and/or dynamic liquid presence within the structure. The multi-level compensation results in more accurate detection of changes in the structure.

Figure 3:
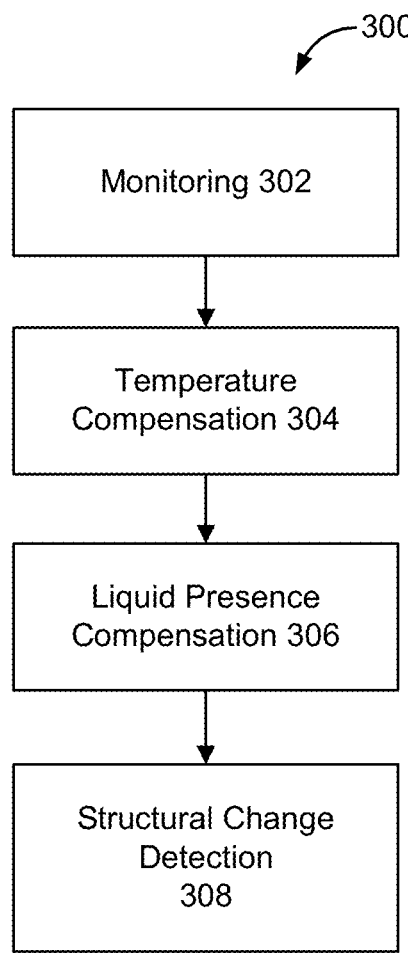
FIG. 3 illustrates an example flow diagram for detecting changes to a structure.

FIG. 3 illustrates an example flow diagram 300 for detecting changes to a structure. Monitoring 302 of acoustic signals that travel along the structure may be performed to determine differences between baseline and monitoring signals. To account for changes in operating temperature of the structure (e.g., changes in temperature of the structure, temperature surrounding the structure, temperature of material inside the structure) between acquisition of the baseline and monitoring signals, temperature compensation 304 may be performed. The change to the operating temperature of the structure may cause shift in the signals in the time-domain. The temperature compensation 304 may include phase shifting of signals (e.g., monitoring signal to the baseline signal, or vice versa) in the time-domain. The signals may be shifted to compensate for shifts caused by the change in the operating temperature of the structure.

To account for presence of liquid within the structure (e.g., non-flowing or flowing liquid inside a pipe) during acquisition of the baseline and/or monitoring signals, liquid presence compensation 306 may be performed. Liquid presence within the structure may cause a liquid boundary effect. A liquid boundary effect may refer to change in the acoustic signals due to the interaction between the liquid and the structure. Contact between the liquid and the structure (liquid boundary) may cause complex interaction that changes the signal characteristics (e.g., amplitude, frequency content) of acoustic signals traveling along the structure. Liquid presence within the structure may cause the liquid boundary effect in cases where the liquid is not flowing (static liquid boundary) and in cases where the liquid is flowing (dynamic liquid boundary). The liquid boundary effects may be difficult to predict and quantify. For example, a straight pipe filled with liquid may exhibit complex liquid-mediated ultrasonic modes and modified dispersive characteristics of guided waves compared to when the pipe is empty. Such modes and dispersive characteristics may be sensitively dependent on temperature and flow conditions. Even if the characteristics of liquid presence within the structure remains the same (e.g., amount and type of liquid flow remains the same) between acquisition of signals, slightest variation in pump power for liquid flow may result in relatively large change between the baseline and monitoring signals. The liquid presence compensation 306 may identify frequencies that are dominated by liquid presence within the structure and exclude the identified frequencies from use in detecting changes to the structure.

The temperature compensation 304 and the liquid presence compensation 306 may remove/reduce/counteract the effects, on the acoustic signals, of changes in operating temperature of the structure and the liquid presence within the structure. The temperature compensation 304 and the liquid presence compensation 306 may remove/reduce/counteract the interference of temperature change and liquid presence on the acoustic signals. Structural change detection 308 may be performed on the temperature and liquid-presence compensated signals to detect changes to the structure.

While FIG. 3 shows temperature compensation being performed before liquid presence compensation, this is merely as an example and is not meant to be limiting. In some implementations, liquid presence compensation may be performed before temperature compensation. In some implementations, liquid presence compensation and temperature compensation may be performed at the same time.

Referring back to FIG. 1, the acoustic transmission transducer 14 may refer to a device configured to convert energy from one form to another. The acoustic transmission transducer 14 may be configured to convert a signal in one form of energy to a signal in another form of energy. The acoustic transmission transducer 14 may be configured to convert a received signal into one or more acoustic signals. The acoustic transmission transducer 14 may be configured to generate the acoustic signal(s) for transmission along a structure. The acoustic transmission transducer 14 may be configured to transmit the acoustic signal(s) along a structure, such as from one part of the structure to another part of structure, or from one end of the structure to another end of the structure. In some implementations, an acoustic transmission transducer may include one or more compressive transducers and/or one or more shear transducers. Compressional and/or shear excitation may be used to excite a structure for transmission of signals (e.g., baseline signal, monitoring signal).

An acoustic signal transmitted by the acoustic transmission transducer 14 may have one or more certain (chosen) amplitude time-frequencies to excite multiple modes of acoustic propagation in the structure. For example, one or more amplitude-time frequency characteristics of an acoustic signal may be tuned for one or more structures and/or one or more changes to the structure. Specific amplitude-time-frequency characteristic(s) may be used for specific structure (e.g., acoustic signals with different amplitude-time-frequency characteristics are transmitted for pipe versus tank). Specific amplitude-time-frequency characteristic(s) may be used for specific change(s) to structure (e.g., acoustic signals with different amplitude-time-frequency characteristics are transmitted to detect different changes to the structure).

In some implementations, acoustic signals with different amplitude-time-frequency characteristics may be generated by different hardware. For example, different hardware/combinations of hardware may be used to generate acoustic signals with different amplitude-time-frequency characteristics. For instance, specific hardware may be used to generate acoustic signals that are optimized for a specific type of structure (e.g., pipe, vessel, tank) and/or an anticipated change (e.g., anticipated defect or damage in the structure).

The acoustic reception transducer 15 may refer to a device configured to convert energy from one form to another. The acoustic reception transducer 15 may be configured to convert a signal in one form of energy to a signal in another form of energy. The acoustic reception transducer 15 may be configured to convert a received acoustic signal into one or more output signals. The acoustic reception transducer 15 may be configured to receive one or more acoustic signals transmitted by the acoustic transmission transducer 14 after the acoustic signal(s) have traveled along at least a portion of the structure. The acoustic reception transducer 15 may be configured to generate output signals conveying signal characteristics of the received acoustic signal(s) and/or other information. The acoustic data acquisition (e.g., acoustic signal reception, output signal generation) may be configured for high signal-to-noise ratio in the probed structure. In some implementations, an acoustic reception transducer may include one or more compressive transducers and/or one or more shear transducers. Compressional and/or shear excitation of the structure may be measured to detect changes to the structure.

The acoustic transmission transducer 14 and the acoustic reception transducer 15 may be used to transmit acoustic signal(s) along a structure and receive the transmitted acoustic signal(s) at different times. The signals transmitted/received at different times may be used to determine changes to the characteristic(s) of the acoustic signal(s). For example, an initial acoustic signal transmission/reception may be used to establish baseline signal characteristics of an acoustic signal traveling along a structure. The baseline signal characteristics may reflect the initial (baseline) condition of the structure. The baseline signal characteristics may reflect the condition of the structure from which changes are to be identified. The signal transmitted/received to establish baseline signal characteristics may be referred to as a baseline signal.

Subsequent acoustic signal transmission/reception may be used to determine changes in the signal characteristics of the acoustic signal. A change in the signal characteristics of the acoustic signal may include a change between the signal characteristics of the subsequent acoustic signal and the baseline signal characteristics (signal characteristics of the initial/baseline acoustic signal). The change in the signal characteristics of the acoustic signal may be analyzed to detect the change to the structure. The signal transmitted/received to determine change from the baseline signal characteristics may be referred to as a monitoring signal.

Figure 4:
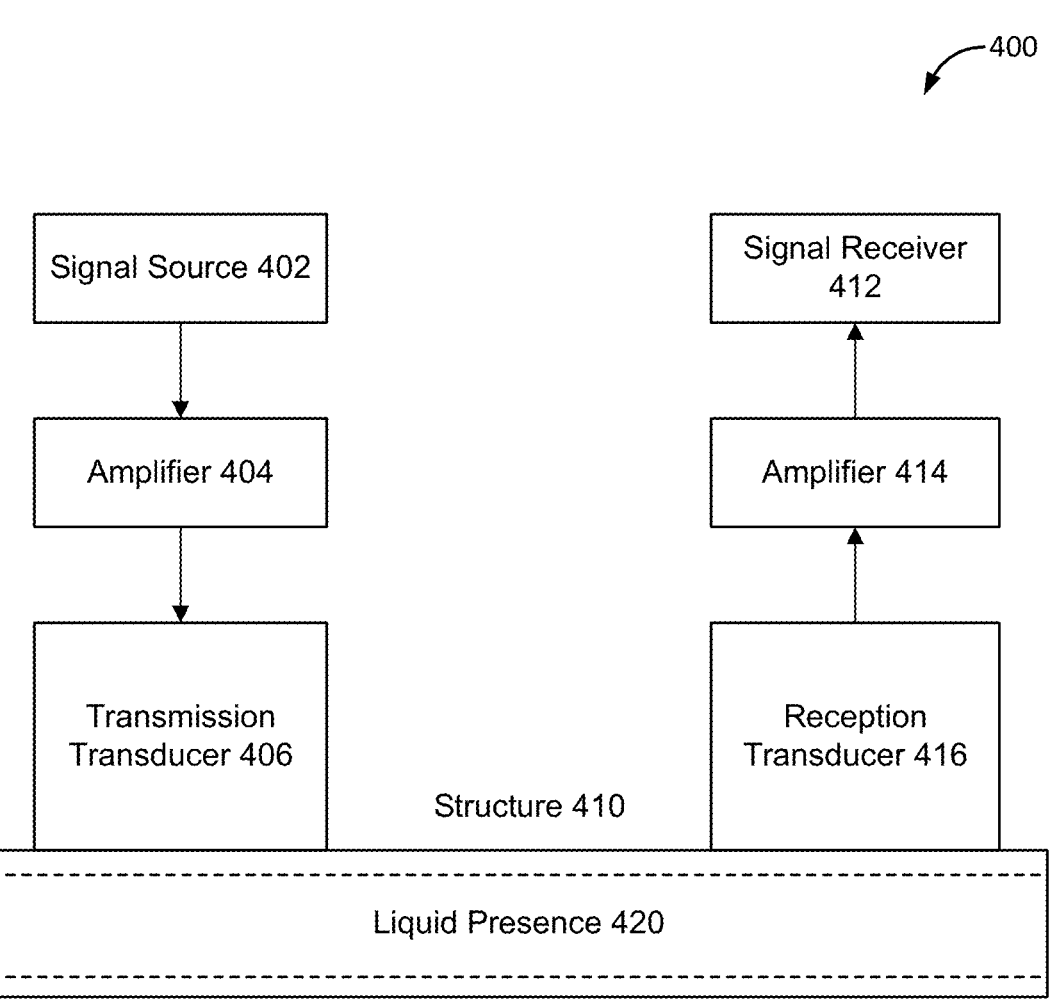
FIG. 4 illustrates an example use of acoustic signal for detecting changes to a structure.

FIG. 4 illustrates an example use of acoustic signal for detecting changes to a structure 410 (e.g., a pipe). The structure 410 may include non-flowing or flowing liquid (liquid presence 420). A signal source 402 may provide an acoustic signal with one or more chosen signal characteristics. The acoustic signal may be amplified by an amplifier 404, and passed onto a transmission transducer 406. The transmission transducer 406 and a reception transducer 416 may be coupled to the structure 410. Coupling between the structure 410 and the transducers 406, 416 may include embedding, mechanical attachment, non-contact air coupling, remote light coupling, and/or other coupling. The transmission transducer 406 may transmit acoustic signal(s) along the structure 410. The acoustic signal(s) may be single mode, multimode, broadband, narrowband, and/or other types of signals. The acoustic signal(s) may have one or more frequencies/one or more ranges of frequencies. For example, the acoustic signal(s) may include ultrasonic signal(s). The acoustic signal(s) may include one or more frequency chirp signals (e.g., with signal strength between 1V and 100V, with spectral content between 10 kHz and 200 kHz, with duration of 0.1 ms to 10 ms). In some implementations, multi-mode, broadband ultrasonic signals may be used. Multi-mode, broadband ultrasonic signals may interact with and detect structural changes in different sizes and shapes. Multi-mode, broadband ultrasonic signals may enable detection of structural changes in the presence of geometric non-uniformities.

The acoustic signal(s) may be detected by the reception transducer 416 after the acoustic signal(s) have traveled along at least a portion of the structure 410. The reception transducer 416 may convert the received acoustic signal into output (electrical) signals. The output signals may be amplified by an amplifier 414 before being passed onto a signal receiver 412. The acoustic signal from the signal source 402 and/or the received acoustic signal may be synchronized and processed by the signal receiver 412. In some implementations, one or more of the signal source 402, the amplifier 404, and/or the transmission transducer 406 may be included within the acoustic transmission transducer 14. In some implementations, one or more of the signal receiver 412, the amplifier 414, and/or the reception transducer 416 may be included within the acoustic reception transducer 15.

In some implementations, multiple transmission transducers and multiple reception transducers may be coupled to the structure 410. Portions of the structure 410 between individual transmission-reception-transducer pairs may form inspection zones. Changes in signal characteristics of acoustic signal that travel through individual inspection zones may be used to identify one or more changes to the structure 410 within individual inspection zones and may enable monitoring of the structure 410 in segments. Such detection of changes to the structure 410 may allow for localization of changes within the structure 410. In some implementations, transmission-reception-transducer pairs may be coupled to the structure 410 such that individual segments are of uniform size.

In some implementations, transmission transducers and reception transducers may be placed along a structure to account for irregular shape of the structure. For instance, for portions/segments of the structure with irregular geometric shapes, multiple/additional transmission transducers and/or multiple/additional reception transducers may be used to transmit and receive acoustic signal(s). Increase in number of transmission transducers may facilitate more uniform acoustic excitation of the structure and lead to better sensitivity, selectivity, and/or robustness of the structural change detection based on acoustic signals. Increase in number of reception transducers may increase redundancy of the system, which may increase the reliability and robustness of the structural change detection based on acoustic signals.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to acoustic signals, information relating to transmission of acoustic signals, information relating to reception of acoustic signals, information relating to output signals, information relating to signal characteristics, information relating to changes in signal characteristics, information relating to baseline signal characteristics, information relating to structures, information relating to changes to structures, information relating to operating temperature of structures, information relating to liquid presence within structures, information relating to liquid boundary effects, information relating to phase-shifting, information relating to frequency dominated by liquid presence within structures, information relating to frequency exclusion, information relating to detection of changes to structures, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate detecting changes to a structure. The machine-readable instructions 100 may include one or more computer program components. The machine-readable instructions 100 may include one or more of a monitor component 102, a phase-shift component 104, a filter component 106, a detect component 108, and/or other computer program components.

The monitor component 102 may be configured to monitor the output signals for one or more changes in the signal characteristics of the received acoustic signal. Monitoring the output signals may include one or more of checking, examining, tracking, observing, watching, and/or otherwise monitoring the output signals. The monitor component 102 may monitor the output signals continuously, periodically, on-demand, and/or based on other basis. For example, the monitor component 102 may monitor the output signals as the output signals are received/generated. The monitor component 102 may monitor the output signals at a periodic rate (e.g., a set number of times per day/week/month/year). The monitor component 102 may monitor the output signals based on user/system command to monitor the output signals. Other basis for monitoring the output signals are contemplated.

The monitor component 102 may monitor the output signals to determine whether there is any change or a particular change in the signal characteristics of the received acoustic signal. For example, the monitor component 102 may monitor the output signals to determine whether one or more of the signal characteristics has changed at all and/or has changed beyond a certain amount (e.g., beyond threshold amount).

The monitor component 102 may be configured to monitor the output signals for one or more changes in the signal characteristics of the received acoustic signal from baseline signal characteristics. The change(s) in the signal characteristics of the received acoustic signal may include one or more differences between the signal characteristics of the received acoustic signal and the baseline signal characteristics. The change(s) in the signal characteristics of the received acoustic signal may include one or more differences between the received acoustic signal (monitoring signal) and the baseline signal. Other changes in the signal characteristics of the received acoustic signal are contemplated.

A signal characteristic of an acoustic signal may refer to a feature and/or a quality of the acoustic signal. A signal characteristic of an acoustic signal may relate to one or more of amplitude, wavelength, period, frequency and/or other features/qualities of the acoustic signal. A signal characteristic of an acoustic signal may include a time-varying characteristic, a frequency-varying characteristic, and/or other varying characteristics. A signal characteristic of an acoustic signal may include a static characteristic (e.g., a characteristic that does not change with respect to time and/or frequency) or a dynamic characteristic (e.g., a characteristic that changes with respect to time and/or frequency).

Monitoring the output signals conveying signal characteristics of the received acoustic signal for a change in the signal characteristics of the received acoustic signal may include determining a difference between the received acoustic signal/signal characteristics and a baseline signal/baseline signal characteristics. For example, differential signal changes may be determined by taking a difference between a previously recorded baseline signal and the received acoustic signal. Differential signal characteristic changes may be determined by taking a difference between a previously recorded baseline signal characteristics and the signal characteristics of the received acoustic signal.

Baseline signal characteristics may refer to characteristics to be used for comparison. Baseline signal characteristics may refer to signal characteristics of a baseline signal transmitted through the structure. A baseline signal may refer to an acoustic signal transmitted through the structure when the structure is in a known state/condition and/or baseline state/condition. For example, an initial acoustic signal transmission/reception may be used to establish baseline signal characteristics of an acoustic signal traveling along a structure. The baseline signal characteristics may characterize the state/condition of the structure when the initial acoustic signal was transmitted/received through the structure.

For instance, the initial acoustic signal may be transmitted/received through the structure when the structure is installed and/or after a detailed inspection in which the condition of the structure is determined. Once the structure is characterized in a known state/condition by the baseline signal characteristics, signal characteristics of subsequent acoustic signals that are transmitted/received through the structure may be monitored to detect deviations from the baseline signal characteristics. Deviation of the signal characteristics from the baseline signal characteristics may indicate that the structure has changed (e.g., defect or damage formation) compared to when the baseline signal characteristics was established.

In some implementations, the baseline and monitoring signals and/or the baseline and monitoring signal characteristics may be adjusted and/or normalized to increase reliability of structural change detection with change in measurement conditions (e.g., degradation of transducers and/or coupling medium). For example, DC components may be removed from the baseline and monitoring signals/signal characteristics. The DC components may be a single scalar quantity calculated as the average of amplitudes in the time domain. The DC offset-removed time domain signals/signal characteristics may be normalized by a positive maximum amplitude.

The change(s) in the signal characteristics of the received acoustic signal may be caused by one or more changes to the structure (e.g., material loss, material conversion, and/or material addition), one or more changes in operating temperature of the structure, and/or liquid presence within the structure. The operating temperature of the structure may refer to the temperature at which the structure is operating. The change(s) in the operating temperature of the structure may include change(s) in temperature of the structure, change(s) in temperature around the structure, change(s) in temperature of material (e.g., fluid) inside the structure, and/or other changes in the operating temperature of the structure. The change(s) to the operating temperature of the structure may cause shift in the acoustic signals in the time-domain.

The liquid presence within the structure may refer to presence of liquid within the structure. The liquid presence within the structure may include flowing or non-flowing liquid within the structure. The speed of liquid flow within the structure may remain the same or change. The liquid presence within the structure may include different types and/or amounts of liquid within the structure. For example, the liquid presence within the structure may include the liquid fully or partially filling the structure. The types and/or amount of liquid within the structure may remain the same or change. The liquid presence within the structure may cause a liquid boundary effect. The liquid boundary effect may refer to change in the acoustic signals due to the interaction between the liquid and the structure. The liquid boundary effect may include changes in amplitude and/or frequency content of the acoustic signals due to the interaction between the liquid and the structure. The change(s) in the signal characteristics caused be change(s) in operating temperature of the structure and/or liquid presence within the structure may make detection of change(s) to the structure via signal monitoring difficult.

The phase-shift component 104 may be configured to compensate for the change(s) to the operating temperature of the structure. Compensating for the change(s) to the operating temperature of the structure may include removing, reducing, counteracting, and/or otherwise compensating for the effect of the change(s) to the operating temperature of the structure on the acoustic signals/signal characteristics. The phase-shift component 104 may be configured to compensate for the change(s) to the operating temperature of the structure by phase-shifting the signal characteristics of the received acoustic signal. The signal characteristics of the received acoustic signal may be phase-shifted in the time-domain. The signal characteristics of the received acoustic signal may be phase-shifted to match the baseline signal characteristics. The signal characteristics of the received acoustic signal may be phase-shifted to match the baseline signal characteristics using cross-correlation and/or other techniques.

For example, the baseline and monitoring signals/signal characteristics may be divided into multiple bins in the time-domain. A cross-correlation function may be applied to individual bins of the baseline and monitoring signals/signal characteristics to calculate the time delay for maximum coherence to achieve phase-shift compensation. The monitoring signal/signal characteristics may be rearranged in the time-domain to maximize the coherence and minimize the difference with the baseline signal/signal characteristics. Rather than using a global shift, individual bins may be shifted using a cross-correlation function. For example, individual bins may be shifted to an earlier or later time. Individual bins may be shifted independently from other bins. Phase-shifting in the time-domain may be performed without knowing the values of the operating temperature and/or the values of changes in the operating temperature.

In some implementations, the minimum size of the bins may be determined based on the minimum wavelength of the ultrasonic waves of interest, and the maximum size of the bins may be determined by the time delay dependence of the phase shift that is to be compensated. Example bin sizes may range between 0.01 ms and 1 ms. The number of bins may be customized for the monitoring system. Example bin numbers may range between 10 and 1000.

The filter component 106 may be configured to compensate for the liquid boundary effect. Compensating for the liquid boundary effect may include removing, reducing, counteracting, and/or otherwise compensating for the liquid boundary effect on the acoustic signals/signal characteristics. The filter component 106 may be configured to compensate for the liquid boundary effect by excluding one or more frequencies of the received acoustic signal. The frequenc(ies) of the received acoustic signal dominated by the liquid presence within the structure may be excluded from use in detecting change(s) to the structure. A frequency of an acoustic signal dominated by the liquid presence within the structure may refer to a frequency of the acoustic signal in which the liquid presence has a large (e.g., more than a threshold amount) of influence. A frequency of an acoustic signal dominated by the liquid presence within the structure may refer to a frequency of the acoustic signal in which the liquid effect causes more than a threshold amount of change.

Such frequenc(ies) may be removed from use in detecting change(s) to the structure to make the structural change detection more accurate.

In some implementations, the frequenc(ies) of the received acoustic signal dominated by the liquid presence within the structure may be determined based on difference between the signal characteristics of multiple acoustic signals and/or other information. The multiple acoustic signals may be transmitted along the structure before reception. The multiple acoustic signals may be received across a time duration without structural change and without operating temperature change. Multiple acoustic signals may be individually transmitted along the structure and received over a time duration in which the structure does not change and the operating temperature of the structure does not change. For such acoustic signals, the changes in the signals/signal characteristics may be attributed to the liquid presence within the structure/the liquid boundary effect. That is, if multiple acoustics signals are transmitted along the structure without change in the structure and/or operating temperature, the changes in the acoustic signals may be due to the liquid presence within the structure/the liquid boundary effect. The frequenc(ies) of the acoustic signals with changes attributed to the liquid presence within the structure/the liquid boundary effect may be identified and excluded from use in structural change detection.

In some implementations, the frequenc(es) that are dominated by the liquid presence within the structure may be identified for the life of the structure. For example, the frequenc(es) dominated by the liquid presence within the structure may not change, and the frequenc(es) may be identified once (e.g., when baseline signals are acquired). The liquid-presence compensation may remain the same over time. In some implementations, the frequenc(es) that are dominated by the liquid presence within the structure may be identified for on an on-going basis. For example, the frequenc(es) dominated by the liquid presence within the structure may change, and the frequenc(ies) may be identified when monitoring signals are acquired. The liquid-presence compensation may change over time.

To determine the frequenc(ies) of the received acoustic signal dominated by the liquid presence within the structure the difference between the signal characteristics of multiple acoustic signals may be mapped in a frequency-time domain. The difference(s) between the multiple acoustic signals (e.g., multiple normalized acoustic signals) may be determined, and Short-Time Fourier Transforms (STFT) of the difference signal(s) may be performed to reveal mixed time-frequency characteristics of the difference signals(s). A two-dimensional map of frequency component intensity as a function of time and frequency may be generated. This process may be repeated using more than two acoustic signals to increase signal-to-noise ratio in the spectral content. Averaged standard deviation of power intensity in the frequency-time domain may be determined for different frequencies. This may remove the time information and result in a plot of averaged standard deviation of power intensity as a function of frequency.

The frequenc(ies) dominated by the liquid presence within the structure may be determined based on the averaged standard deviation of power intensity in the frequency-time domain and/or other information. Large values in the averaged standard deviation of power intensity may be attributed to the liquid presence within the structure/the liquid boundary effect. Frequencies with large values in the averaged standard deviation of power intensity may be identified as frequencies dominated by the liquid presence within the structure. Cutoff for determination of frequenc (ies) dominated by liquid presence may be determined based on individual values of averaged standard deviation of power intensity or relative values of averaged standard deviation of power intensity. For example, frequencies with large values in the averaged standard deviation of power intensity may include frequencies in which the averaged standard deviation of power intensity is greater than a threshold values. Frequencies with large values in the averaged standard deviation of power intensity may include a certain top percentage of frequencies with higher averaged standard deviation of power intensity (e.g., top 90-95% of frequencies with higher averaged standard deviation of power intensity). Even with removal of most (e.g., 90-95%) of frequencies, the remaining frequencies may contain sufficient information to enable structural change detection (e.g., mechanical change in structure that involves less than 1% of the structural volume).

Figure 5:
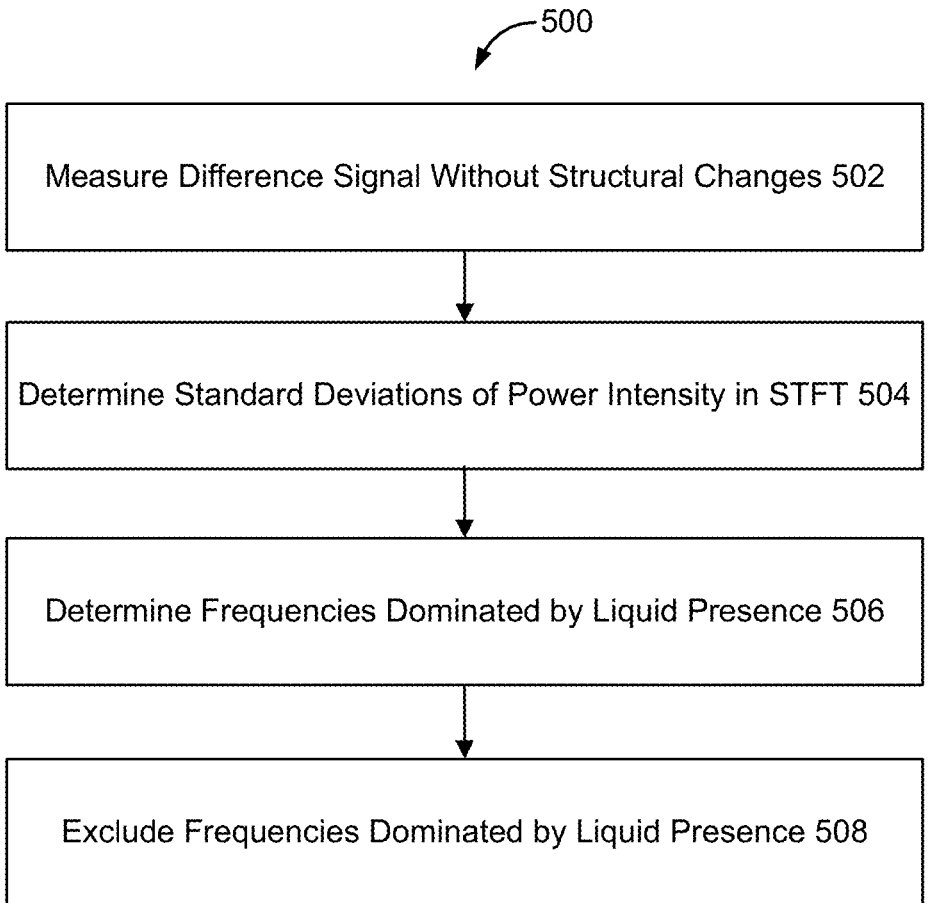
FIG. 5 illustrates an example flow diagram for excluding frequencies of acoustic signals dominated by liquid presence within a structure.

FIG. 5 illustrates an example flow diagram 500 for excluding frequencies of acoustic signals dominated by liquid presence within a structure. A difference signal without structural changes may be measured 502. The difference signal may be measured by taking multiple signal measurement over time in which the structure has not changed and the operating temperature has remained the same. The standard deviation of power intensity in STFT of the difference signal may be determined 504. The value of the standard deviation of power intensity for different frequencies may be calculated. The frequencies of the acoustic signals dominated by the liquid presence may be determined 506. The frequencies dominated by the liquid presence may be determined using the values of standard deviation of power intensity for different frequencies. The values of the standard deviation of power intensity may be used as an indicator of the extent to which the frequencies are impacted by the liquid presence. The frequencies dominated by the liquid presence may be excluded from use in detecting structural changes.

FIG. 6A illustrates an example 2D STFT contour map 600 of a difference signal. The values of the 2D STFT contour map 600 may indicate the intensity of the difference signal a function of time and frequency. The 2D STFT contour map 600 may indicate mixed time-frequency characteristics of the difference signal.

Figure 6B:
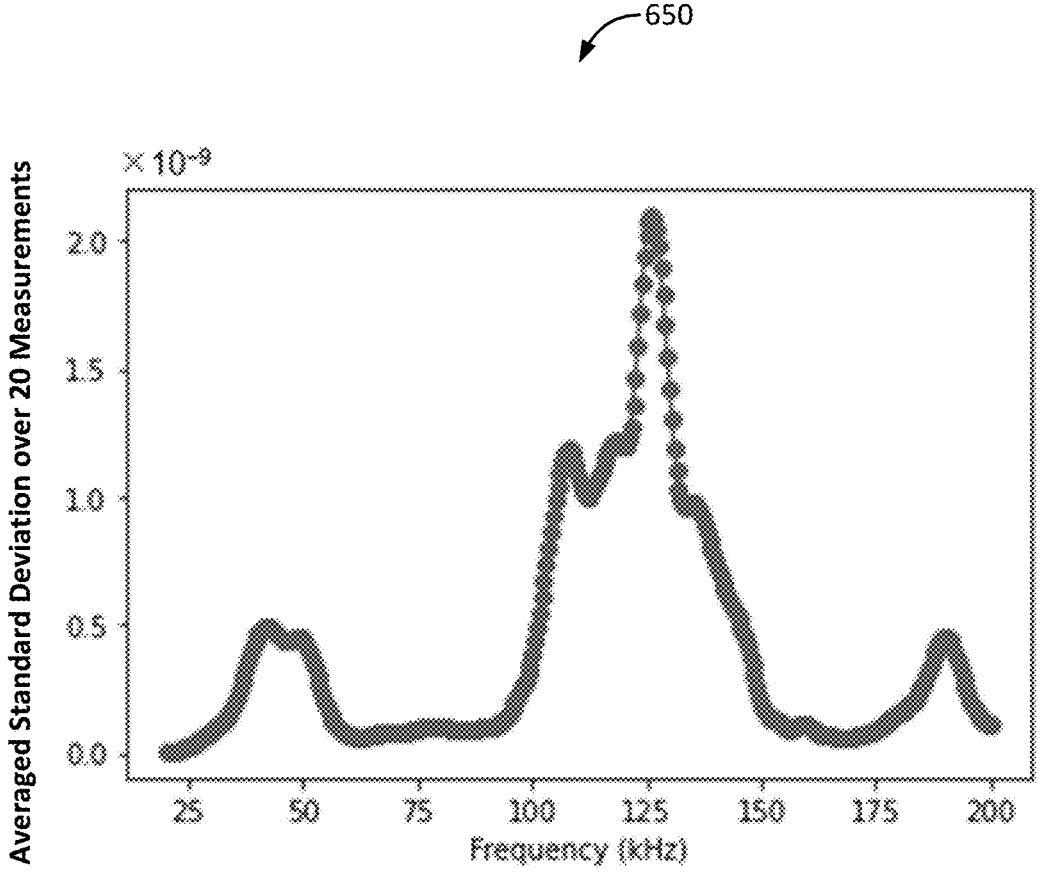
FIG. 6B illustrates an example plot of averaged standard deviation of power intensity at different frequencies.

FIG. 6B illustrates an example plot 650 of averaged standard deviation of power intensity at different frequencies. The plot 650 may be generated from the 2D STFT contour map 600, shown in FIG. 6A. The plot 650 may indicate values of averaged standard deviation of power intensity in STFT for difference frequencies. The plot 650 may provide information on which frequencies are more or less sensitive to the presence of liquid within the structure. The frequencies that are most sensitive to the presence of liquid within the structure may be excluded from use in detecting changes to the structure. The remaining frequencies may be less dominated by the liquid presence within the structure.

While frequency exclusion has been described with respect to compensating for liquid presence within a structure, the frequency exclusion technique may be applied to compensate for other environmental and operational conditions. For example, the frequency exclusion may be used to compensate for liquid versus metal effects in signal characteristic delays. For instance, the frequency exclusion as described with respect to compensating for liquid presence within a structure may be extended to the time-domain to account for different modes in liquid and filter liquid mediated modes. The signals may be filtered in the time-domain base on arrival of liquid versus non-liquid mediated modes.

The detect component 108 may be configured to detect the change(s) to the structure. Detecting a change to the structure may include one or more of ascertaining, determining, finding, identifying, locating, recognizing, and/or otherwise detecting the change to the structure. Detecting a change to the structure may include detecting a physical/mechanical change to the structure, such as material loss (e.g., pitting, cracking, fracturing of the structure), material conversion (e.g., material corrosion), or material addition (material migration, material accumulation, material adsorption). Detecting a change to the structure may include determining that the structure has changed, determining the location at which the structure has changed, determining the type of change that has occurred, determining the amount/extent of change that has occurred, determining the source/cause of the change, and/or other determination of change to the structure.

The change(s) to the structure may be detected based on the phase-shifted signal characteristics of the received acoustic signal outside the frequencies dominated by the liquid presence within the structure, and/or other information. The phase-shifted signal characteristics of the received acoustic signal outside the frequencies dominated by the liquid presence within the structure may be analyzed to detect the change(s) to the structure. Analysis of the phase-shifted signal characteristics of the received acoustic signal outside the frequencies dominated by the liquid presence within the structure may include one or more of examination, investigation, breakdown, processing, and/or other analysis of the phase-shifted signal characteristics of the received acoustic signal outside the frequencies dominated by the liquid presence within the structure. Structural change detection may be performed using the temperature and liquid-presence compensated signal/signal characteristics.

FIGS. 7A, 7B, 7C, 8A, 8B, 8C, 9A, 9B, and 9C illustrate example detection of changes to a structure with different environmental and operational conditions. In these examples, the temperature (i.e., time-domain) compensation was performed prior to liquid presence (i.e., frequency-domain) compensation. The structure includes a pipe with liquid presence. The pipe was half-filled with liquid (water) for a set of testing and fully-filled with liquid for another set of testing. Different numbers of magnets were attached to the pipe to simulate changes to the structure. Structural change detection was tested with (1) no compensation, (2) temperature compensation, and (3) temperature compensation and liquid-presence compensation. The pipe was examined using both compression excitation and shear excitation, and test results showed that compensation techniques described herein are effective for both compression excitation and shear excitation. A linear chirp signal from 20 to 100 kHz (or, 200 kHz) with a 0.5 ms duration was used and the response was acquired with a 1.2 ms time window.

FIGS. 7A, 7B, 7C, 8A, 8B, 8C, 9A, 9B, and 9C illustrate plots of structural change detections as a function of magnets attached to the pipe. The structural change detection plotted in these figures may correspond to a measure of mechanical changes in the structure. Desired characteristics of structural change detection includes a plot that (1) monotonically increases with increasing number of magnets, and (2) reproduces the result as magnets are taken off and reattached to the pipe.

Figure 7A:
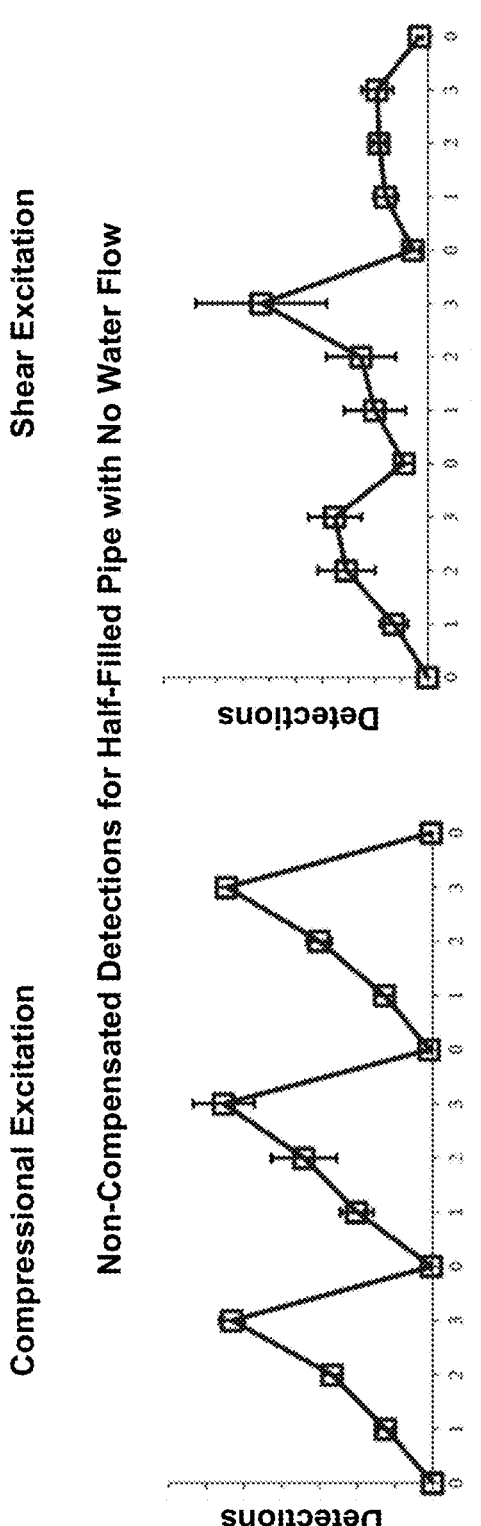
FIG. 7A illustrates examples of non-compensated detection of changes to a structure with non-flowing liquid within the structure.

FIGS. 7A, 7B, and 7C show plots of structural change detections with non-flowing liquid (static liquid boundary). FIG. 7A shows plots of structural change detections with no temperature compensation and no liquid presence compensation. Detections with compressional excitation show good sensitivity to the magnet perturbations. However, detections with shear excitation for pipe half-filled with liquid include a relative high level of noise/spurious signals, indicating that even static liquid boundary may cause a liquid boundary effect and that compensation is required. FIG. 7B shows plots of structural change detections with temperature compensation. As shown in FIG. 7B, only applying temperature compensation in the presence of non-flowing liquid is not sufficient to improve detection accuracy or sensitivity, especially in the case of shear excitation in a half-filled pipe. FIG. 7C shows plots of structural change detections with temperature compensation and liquid presence compensation. As shown in FIG. 7C, the accuracy and sensitivity of structural detection increases in the presence of non-flowing liquid when both temperature compensation and liquid-presence compensation are applied.

Figure 8C:
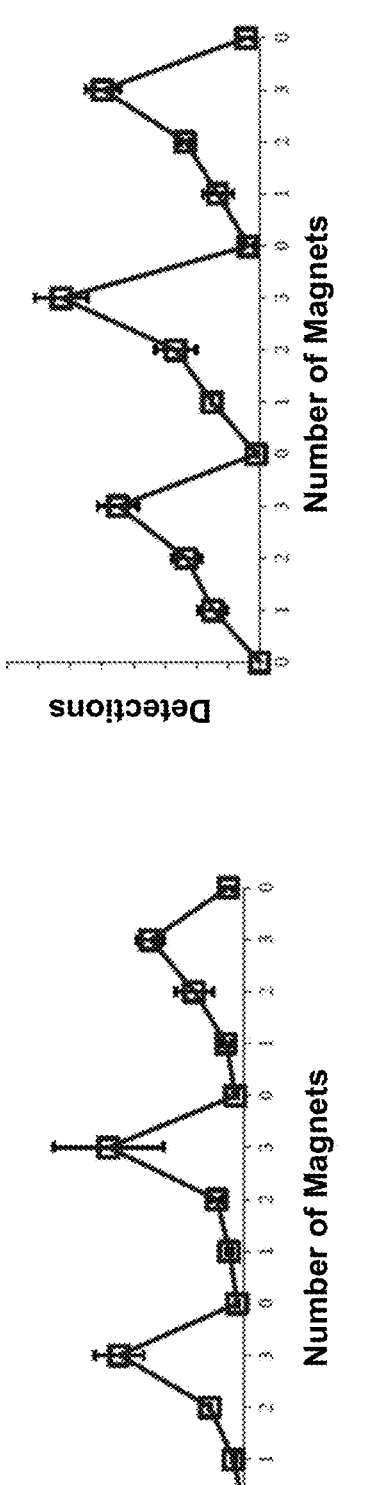
FIG. 8C illustrates examples of temperature-change and liquid-presence compensated detection of changes to a structure with slow-flowing liquid within the structure.

FIGS. 8A, 8B, and 8C show plots of structural change detections with slow-flowing liquid (17 mL/s) (dynamic liquid boundary). FIG. 8A shows plots of structural change detections with no temperature compensation and no liquid presence compensation. FIG. 8B shows plots of structural change detections with temperature compensation. Comparison of FIGS. 8A and 8B shows that sole application of temperature compensation in the presence of slow-flowing liquid does not improve accuracy or sensitivity of the detection. FIG. 8C shows plots of structural change detections with temperature compensation and liquid presence compensation. As shown in FIG. 8C, the accuracy and sensitivity of structural detection increases in the presence of slow-flowing liquid when both temperature compensation and liquid-presence compensation are applied.

Figure 9A:
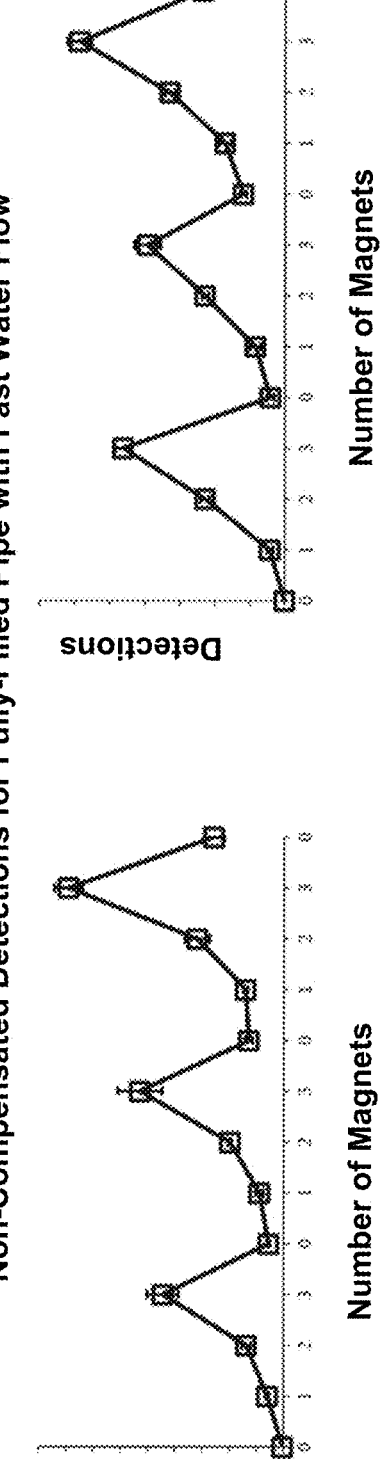
FIG. 9A illustrates examples of non-compensated detection of changes to a structure with fast-flowing liquid within the structure.

FIGS. 9A, 9B, and 9C show plots of structural change detections with fast-flowing liquid (85 mL/s) (dynamic liquid boundary). FIG. 9A shows plots of structural change detections with no temperature compensation and no liquid presence compensation. As shown in FIG. 9A, detection sensitivity and accuracy is significantly degraded, especially with a half-filled pipe. FIG. 9B shows plots of structural change detections with temperature compensation. Comparison of FIGS. 9A and 9B shows that sole application of temperature compensation in the presence of fast-flowing liquid does not improve accuracy or sensitivity of the detection in any significant manner. FIG. 9C shows plots of structural change detections with temperature compensation and liquid presence compensation. As shown in FIG. 9C, the accuracy and sensitivity of structural detection increases in the presence of fast-flowing liquid when both temperature compensation and liquid-presence compensation are applied. FIG. 9C shows that detection with fast-flowing liquid in a half-filled pipe is difficult. When the pipe is half-filled, most space exists for liquid to fluctuate within the pipe. Fluctuation of liquid inside the pipe can intensify liquid-boundary fluctuations/liquid boundary effect. Nevertheless, since shear excitation has a dominant displacement field in the circumferential direction and has minimal coupling to the liquid inside, the application of both temperature compensation and liquid-presence compensation improves accuracy and sensitivity for shear excitation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a non-transitory, tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 in FIG. 1 may be provided by external resources not included in the system 10. External resources may include hosts/sources of information, computing, and/or processing and/or other providers of information, computing, and/or processing outside of the system 10.

Although the processor 11, the electronic storage 13, the acoustic transmission transducer 14, and the acoustic reception transducer 15 are shown to be connected to the interface 12 in FIG. 1, any communication medium may be used to facilitate direct and/or indirect interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, the acoustic transmission transducer 14, and the acoustic reception transducer 15 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array)

rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for detecting changes to a structure. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, one or more operations of the method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, an acoustic signal may be transmitted along a structure. In some implementations, operation 202 may be performed by a component the same as or similar to the acoustic transmission transducer 14 (Shown in FIG. 1 and described herein).

At operation 204, the acoustic signal may be received after the acoustic signal has traveled along at least a portion of the structure. In some implementations, operation 204 may be performed by a component the same as or similar to the acoustic reception transducer 15 (Shown in FIG. 1 and described herein).

At operation 206, output signals conveying signal characteristics of the received acoustic signal may be generated. In some implementations, operation 206 may be performed by a component the same as or similar to the acoustic reception transducer 15 (Shown in FIG. 1 and described herein).

At operation 208, the output signals may be monitored for a change in the signal characteristics of the received acoustic signal(s) from baseline signal characteristics. The change in the signal characteristics of the received acoustic signal(s) may be caused by a change to the structure, a change in operating temperature of the structure, and/or liquid presence within the structure. The liquid presence within the structure may cause a liquid boundary effect. In some implementations, operation 208 may be performed by a component the same as or similar to the monitor component 102 (Shown in FIG. 1 and described herein).

At operation 210, the change in the operating temperature of the structure may be compensated for by phase-shifting the signal characteristics of the received acoustic signal to match the baseline signal characteristics. In some implementations, operation 210 may be performed by a component the same as or similar to the phase-shift component 104 (Shown in FIG. 1 and described herein).

At operation 212, the liquid boundary effect may be compensated for by excluding frequencies of the received acoustic signal dominated by the liquid presence within the structure. In some implementations, operation 212 may be performed by a component the same as or similar to the filter component 106 (Shown in FIG. 1 and described herein).

At operation 214, the change to the structure may be detected based on the phase-shifted signal characteristics of the received acoustic signal outside the frequencies dominated by the liquid presence within the structure and/or other information. In some implementations, operation 214 may be performed by a component the same as or similar to the detect component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for detecting changes to a structure, the system comprising:

an acoustic transmission transducer configured to transmit an acoustic signal along the structure;

an acoustic reception transducer configured (/) to receive the acoustic signal after the acoustic signal has traveled along at least a portion of the structure, and (ii) to generate output signals conveying signal characteristics of the received acoustic signal; and one or more physical processors configured by machine-readable instructions to:

monitor the output signals for a change in the signal characteristics of the received acoustic signal from baseline signal characteristics, the change in the signal characteristics of the received acoustic signal from the baseline signal characteristics caused by a change to the structure, a change in operating temperature of the structure, and/or liquid presence within the structure, the liquid presence within the structure causing a liquid boundary effect;

compensate for the change to the operating temperature of the structure by phase-shifting the signal characteristics of the received acoustic signal to match the baseline signal characteristics;

compensate for the liquid boundary effect by excluding frequencies of the received acoustic signal dominated by the liquid presence within the structure; and detect the change to the structure based on the phase-shifted signal characteristics of the received acoustic signal outside the frequencies dominated by the liquid presence within the structure.

2. The system of claim 1, wherein the frequencies of the received acoustic signal dominated by the liquid presence within the structure are determined based on difference between the signal characteristics of multiple acoustic signals, the multiple acoustic signals received across a time duration without structural change and without operating temperature change.

3. The system of claim 2, wherein the difference between the signal characteristics of multiple acoustic signals is mapped in a frequency-time domain to determine the frequencies of the received acoustic signal dominated by the liquid presence within the structure.

4. The system of claim 3, wherein averaged standard deviation of power intensity in the frequency-time domain is determined for different frequencies, and the frequencies of the received acoustic signal dominated by the liquid presence within the structure are determined based on the averaged standard deviation of power intensity in the frequency-time domain.

5. The system of claim 1, wherein the acoustic transmission transducer includes a compressive transducer and/or a shear transducer.

6. The system of claim 1, wherein the liquid presence within the structure includes flowing or non-flowing liquid within the structure.

7. The system of claim 1, wherein the liquid presence within the structure includes liquid fully or partially filling the structure.

8. The system of claim 1, wherein the change to the structure includes material loss, material conversion, or material addition.

9. The system of claim 1, wherein the structure includes a metallic, rigid structure.

10. The system of claim 9, wherein the metallic, rigid structure includes a pipe.

11. A method for detecting changes to a structure, the method performed by a system including an acoustic transmission transducer, an acoustic reception transducer, and one or more processors, the method comprising:

transmitting, by the acoustic transmission transducer, an acoustic signal along the structure;

receiving, by the acoustic reception transducer, the acoustic signal after the acoustic signal has traveled along at least a portion of the structure;

generating, by the acoustic reception transducer, output signals conveying signal characteristics of the received acoustic signal;

monitoring, by the one or more processors, the output signals for a change in the signal characteristics of the received acoustic signal from baseline signal characteristics, the change in the signal characteristics of the received acoustic signal from the baseline signal characteristics caused by a change to the structure, a change in operating temperature of the structure, and/or liquid presence within the structure, the liquid presence within the structure causing a liquid boundary effect;

compensating, by the one or more processors, for the change to the operating temperature of the structure by phase-shifting the signal characteristics of the received acoustic signal to match the baseline signal characteristics;

compensating, by the one or more processors, for the liquid boundary effect by excluding frequencies of the received acoustic signal dominated by the liquid presence within the structure; and detecting, by the one or more processors, the change to the structure based on the phase-shifted signal characteristics of the received acoustic signal outside the frequencies dominated by the liquid presence within the structure.

12. The method of claim 11, wherein the frequencies of the received acoustic signal dominated by the liquid presence within the structure are determined based on difference between the signal characteristics of multiple acoustic signals, the multiple acoustic signals received across a time duration without structural change and without operating temperature change.

13. The method of claim 12, wherein the difference between the signal characteristics of multiple acoustic signals is mapped in a frequency-time domain to determine the frequencies of the received acoustic signal dominated by the liquid presence within the structure.

14. The method of claim 13, wherein averaged standard deviation of power intensity in the frequency-time domain is determined for different frequencies, and the frequencies of the received acoustic signal dominated by the liquid presence within the structure are determined based on the averaged standard deviation of power intensity in the frequency-time domain.

15. The method of claim 11, wherein the acoustic transmission transducer includes a compressive transducer and/or a shear transducer.

16. The method of claim 11, wherein the liquid presence within the structure includes flowing or non-flowing liquid within the structure.

17. The method of claim 11, wherein the liquid presence within the structure includes liquid fully or partially filling the structure.

18. The method of claim 11, wherein the change to the structure includes material loss, material conversion, or material addition.

19. The method of claim 11, wherein the structure includes a metallic, rigid structure.

20. The method of claim 19, wherein the metallic, rigid structure includes a pipe.

* * * * *